United States Patent Office 2,923,067
Patented Feb. 2, 1960

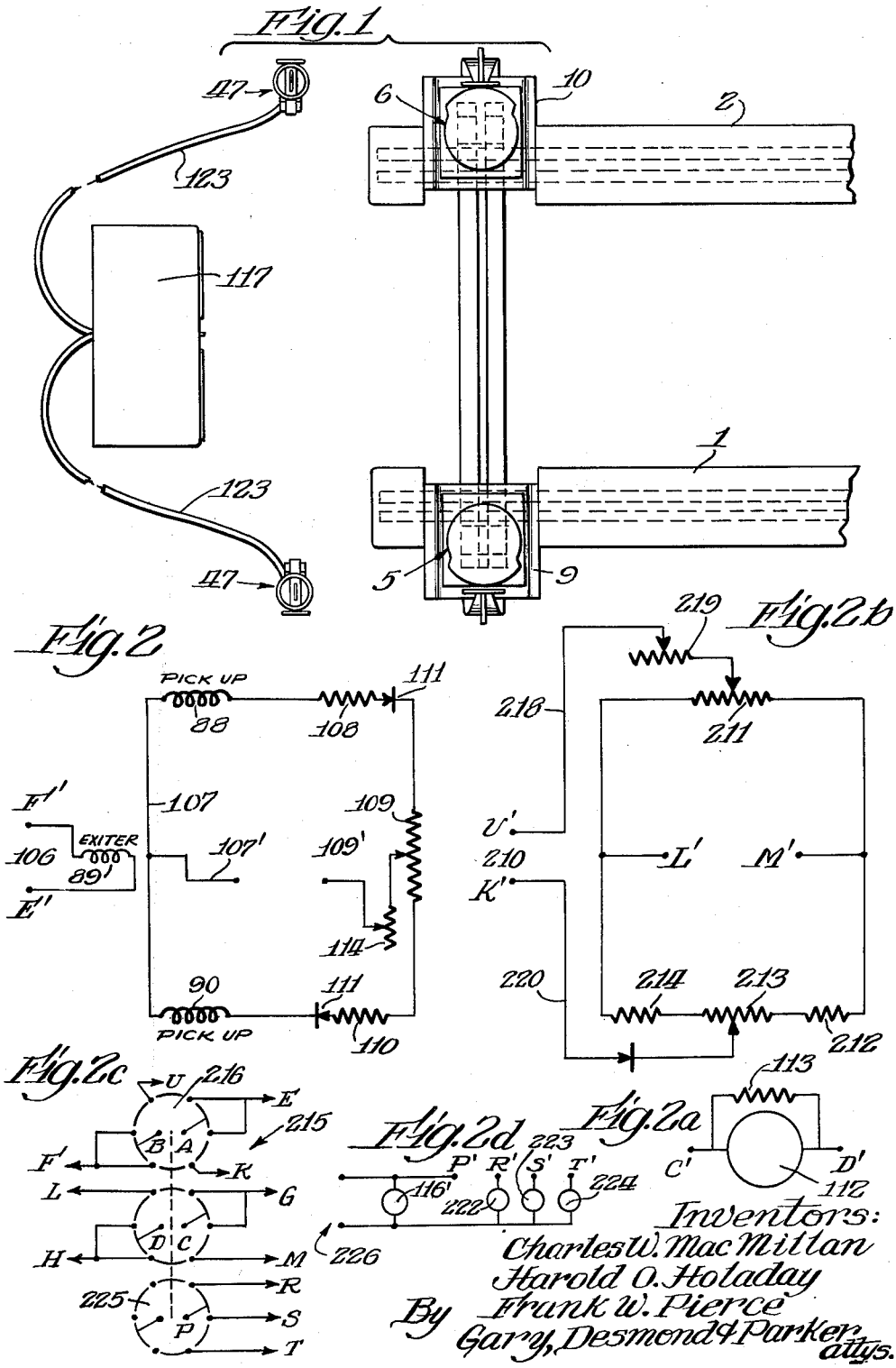

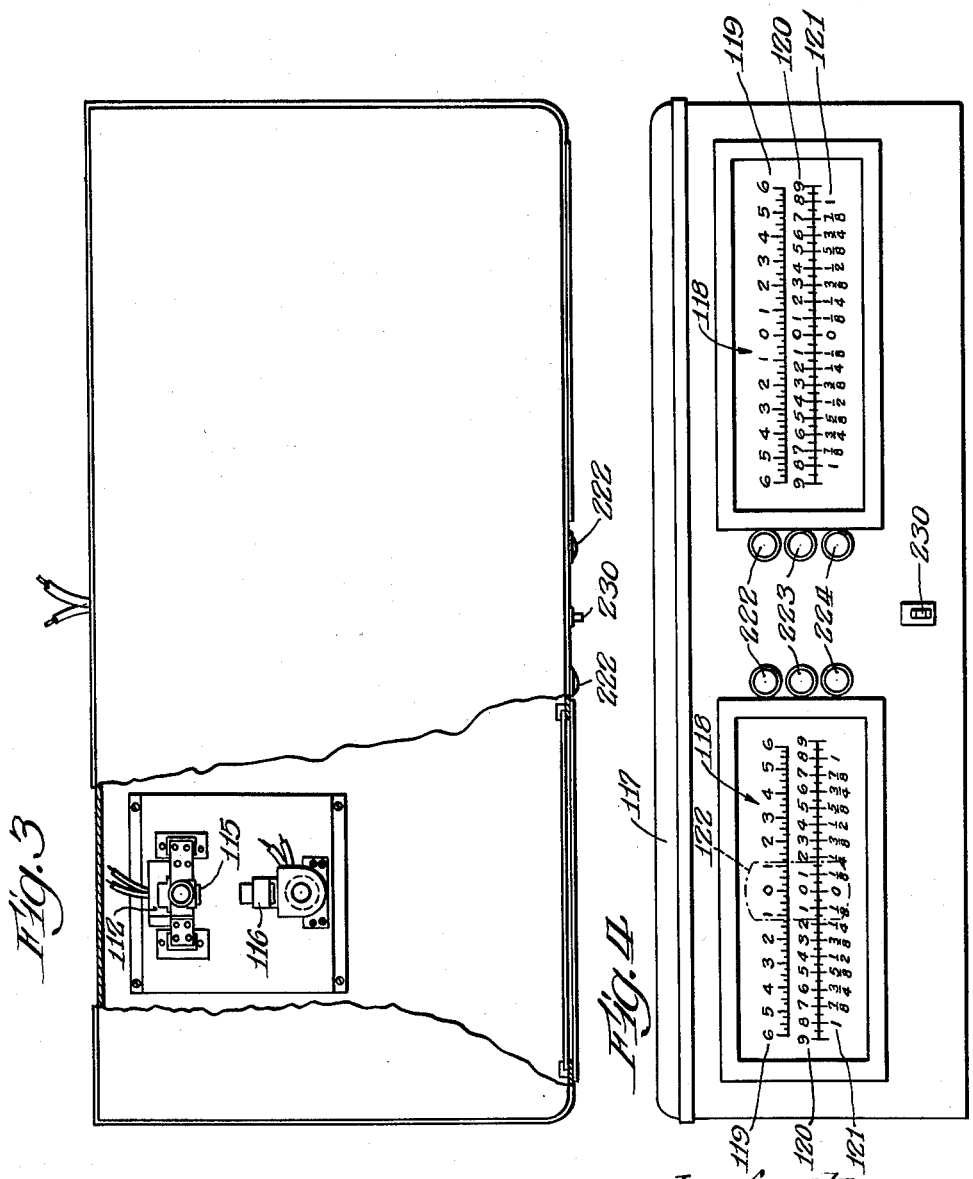

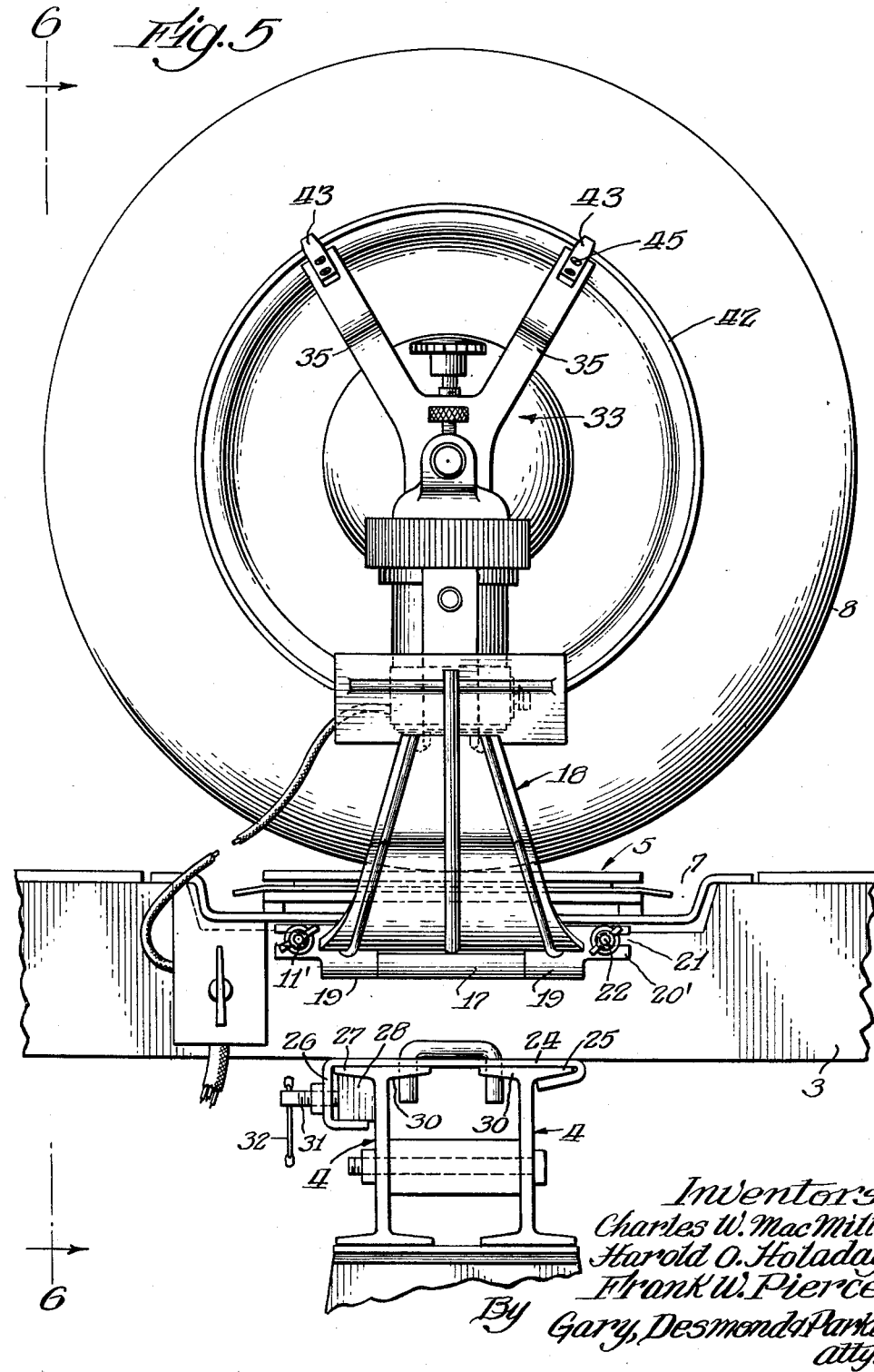

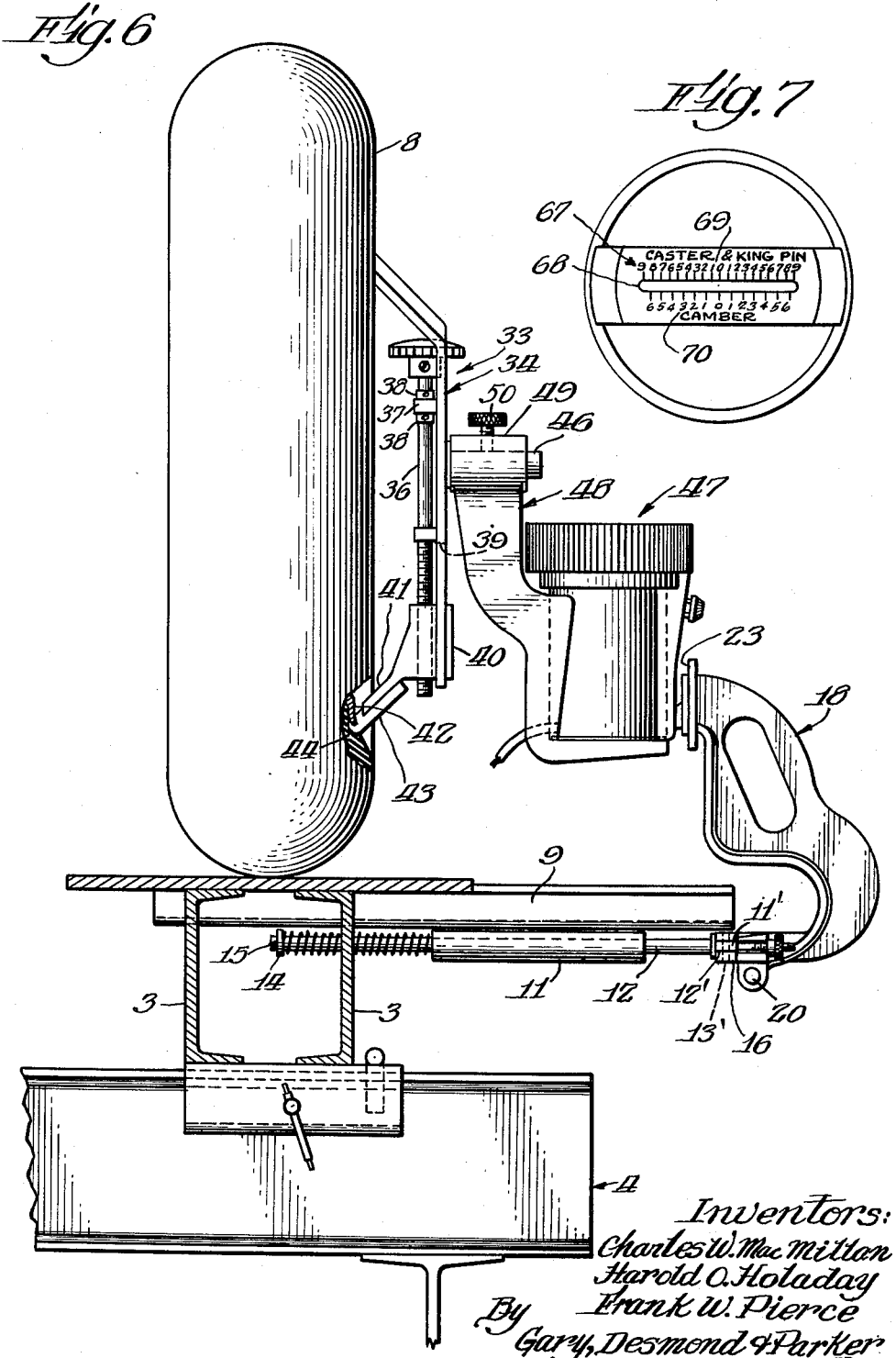

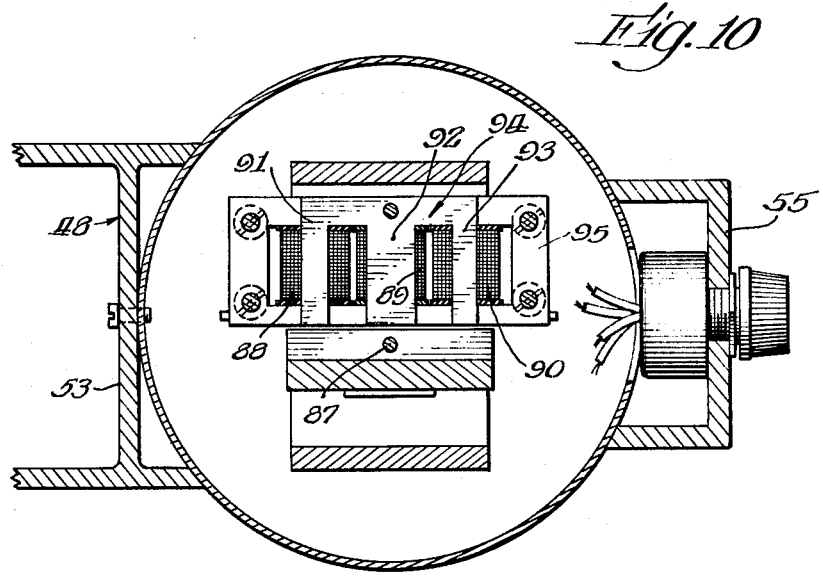
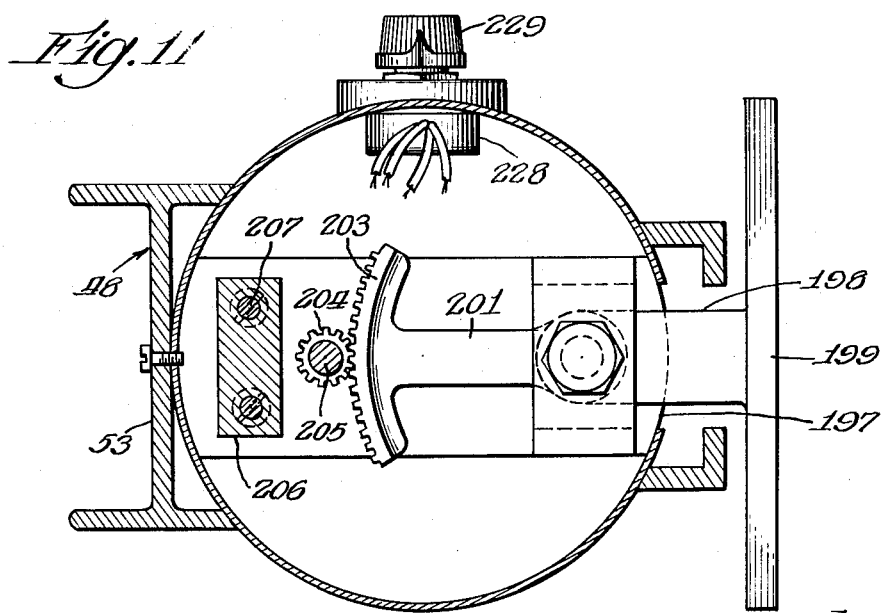

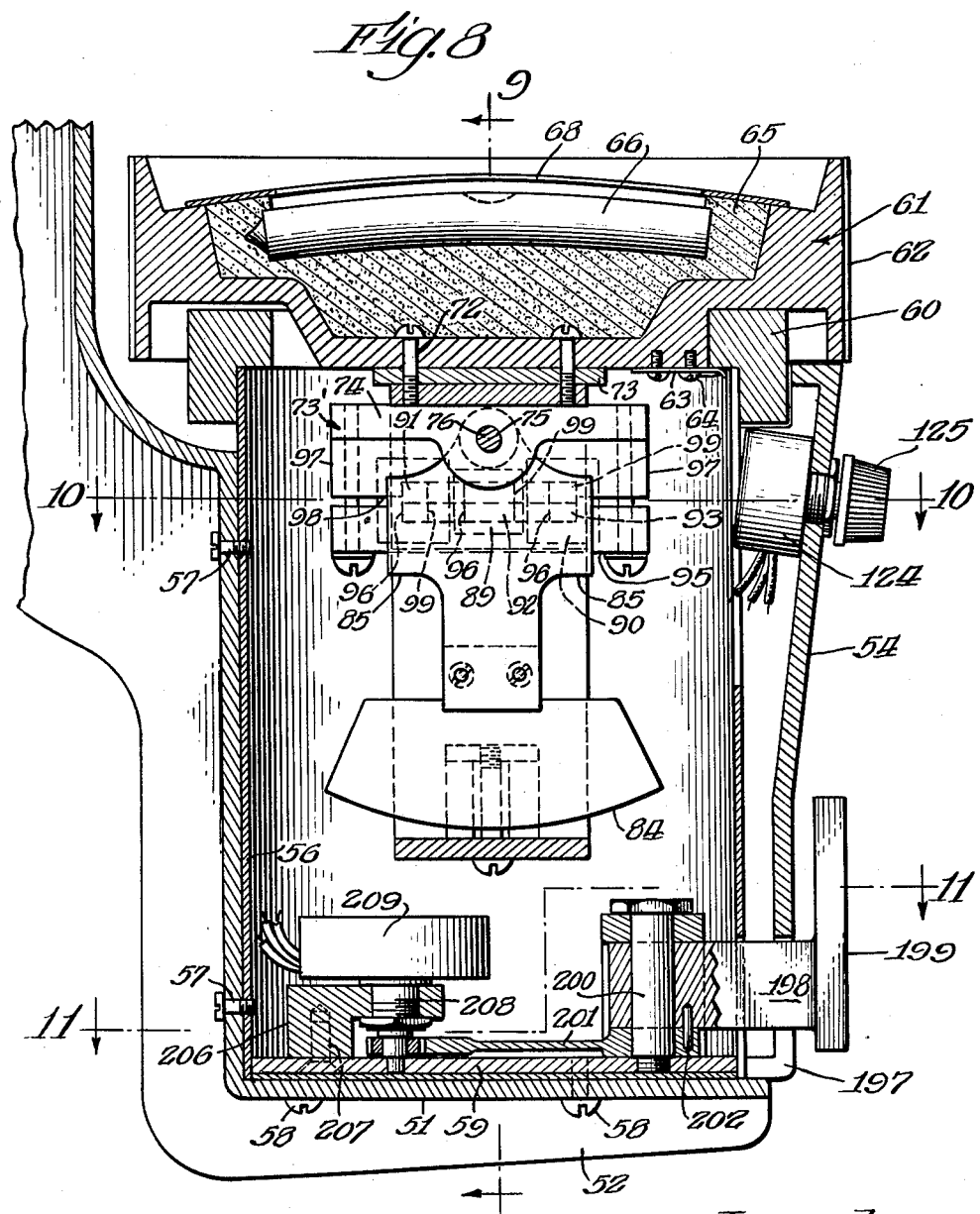

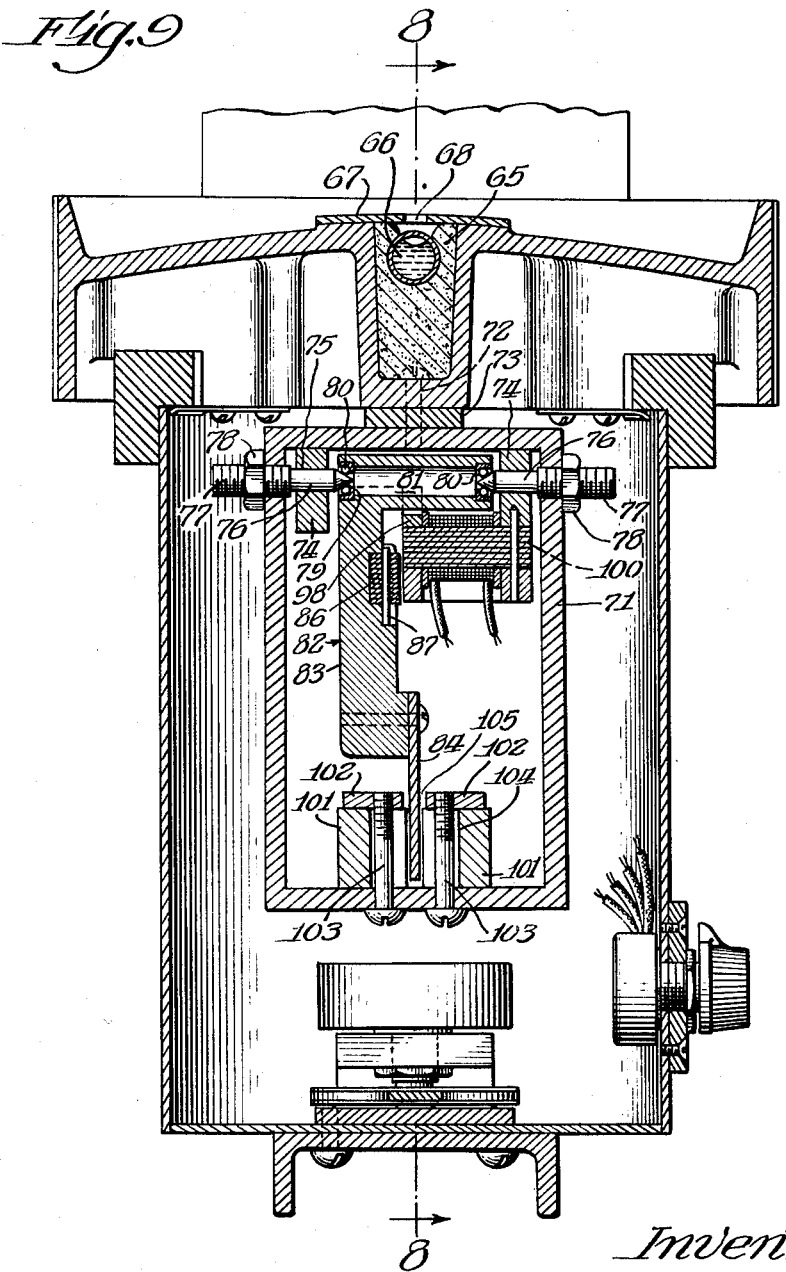

2,923,067

AUTOMOTIVE WHEEL ALIGNMENT TESTING MACHINE

Charles W. MacMillan, Harold O. Holaday, and Frank W. Pierce, Rock Island, Ill., assignors to Bear Manufacturing Company, Rock Island, Ill., a corporation of Delaware Original application April 10, 1952, Serial No. 281,696, now Patent No. 2,765,540, dated October 9, 1956. Divided and this application May 31, 1956, Serial No. 590,340

3 Claims. (Cl. 33—203)

This invention relates to improvements in automotive wheel alignment testing devices and is a division of our copending application Serial No. 281,696, filed April 10, 1952, for Automotive Wheel Alignment Testing Machine, and refers particularly to a wheel alignment testing device wherein direct and remote reading of the important geometrical relationships of the front wheels of an automotive vehicle may be simultaneously secured.

The alignment of wheels of an automotive vehicle has heretofore been tested by various forms of apparatus including spirit levels, protractors and the like. In all such cases, however, the measurements are direct in the sense that they are observed directly from the measuring or testing devices. This involves applying the apparatus or testing devices to the wheels and while so applied noting the readings on the testing devices.

To the average motorist the usual wheel alignment geometrical relationships, such as, caster, camber, toe-in and kingpin inclination are more or less abstract concepts, the importance of which he seldom appreciates. He is usually reluctant, principally because he is not dressed for the occasion, to stoop or bend and inspect many of the working parts of his automobile and when he is told that his car wheels are out of alignment, usually not having a clear concept of precisely what is meant and not being inclined to investigate the testing instruments himself, he accepts, often suspiciously, the word of the mechanic. Usually, he orders the defect corrected, but frequently with misgivings and, in general, the result is that he is a dissatisfied customer.

Although the customer may not completely understand all of the implications of his wheels being out of alignment, if he is given some clew to the fact that such is the case, he senses the importance and necessity of the corrective measures necessary.

Accordingly, in the present invention a wheel alignment testing device is contemplated wherein the tests for caster, camber, toe-in and kingpin inclination can be directly observed, and in addition, the measurements can be remotely displayed in a manner which is convenient for observation by the automobile owner. Further, the measurements are more conveniently set forth for the operator or mechanic, permitting him to observe the readings in comfort and lessening the possibility of errors through observations made hastily in the desire of the operator to remove himself from an uncomfortable position.

One of the important features of the present invention resides in a wheel alignment testing device wherein angular inclinations are converted to degrees of coupling of mutually inductive circuits whereby a current measuring device further converts current rise or fall in said circuits in terms of angular displacements.

As a specific feature of the present invention a damped swingable pendulum carrying an armature is responsive to angular inclinations of wheels of a vehicle, the armature moving adjacent an exciter coil and two pickup coils in such fashion that the reluctance of the magnetic paths from the exciter core to the cores of the pickup coils, that is, the degree of coupling of the coils, may be changed by the swing of the pendulum through predetermined angles. A properly calibrated current measuring instrument is employed to measure the unbalanced condition of the current through the two pickup coils to interpret the angular position of the pendulum in terms of current flow.

Other important features of the present invention will be apparent from the accompanying drawings and following detailed description.

Fig. 1 is a diagrammatic fragmentary top plan view of a portion of a runway with the testing device of the present invention.

Figs. 2, 2a, 2b, 2c and 2d are schematic wiring diagrams of the electric circuits employed.

Fig. 3 is a top plan view, parts being broken away, of the meter cabinet.

Fig. 4 is a front elevational view of the meter cabinet shown in Fig. 3.

Fig. 5 is an enlarged front elevational view of the measuring head as applied to an automobile wheel.

Fig. 6 is a side elevational view of the measuring head, partly in section along line 6—6 of Fig. 5.

Fig. 7 is a top plan view of a portion of the measuring head.

Fig. 8 is an enlarged sectional view taken on line 8—8 of Fig. 9.

Fig. 9 is a sectional view taken on line 9—9 of Fig. 8.

Fig. 10 is a plan sectional view taken on line 10—10 of Fig. 8.

Fig. 11 is a transverse sectional view taken on line 11—11 of Fig. 8.

Referring in detail to the drawings, 1, 2 indicate runways for the support of the wheels of an automobile, the runway 1 being adapted to support the left wheels of an automobile and the runway 2 being adapted to support the right wheels of the automobile, the left and right designations being referred to the position of the wheels as viewed by the driver of the automobile. The runways 1 and 2 are supported by channel irons 3 disposed so as to form substantially a beam of box section. The channels 3, in turn are supported at their front ends by spaced I-beams 4 which extend transversely beneath channels 3. As many transverse groups of I-beams 4 may be employed as desired throughout the length of the runway, but only one such group is shown.

Supported immediately above the transverse I-beams 4 in substantial alignment with each runway, are turning radius plates 5 and 6, mounted upon an indented portion 7 of the channels 1 and 2 respectively. The turning radius plates 5 and 6 are of conventional construction, being rotatably mounted upon ball or roller bearings whereby the plates may be conveniently rotated while carrying the front wheels of an automobile. The turning radius plates, per se, form no part of the present invention and are employed merely as a convenient expedient to permit the swinging of the front wheels of an automobile. For purposes of explanation of the invention the left front wheel 8 of an automobile (not shown) is shown as being mounted upon the turning radius plate 5.

The turning radius plates 5 and 6 are mounted upon supporting plates 9 and 10 respectively which are rigidly secured to or formed integral with the channels 3. A pair of spaced sleeves 11, only one of which is shown in Fig. 6 is mounted upon the lower face of each supporting plate 9 and 10. A rod 12 extends through each sleeve 11 and the rear end of each rod extends through an aperture provided in the web of a channel 3. A coil spring 13 embraces each rod 12 and also extends through the aperture in channel 3, said spring, at one end abutting an end of sleeve 11 and at the other end, bearing upon a washer 14 held in place by a pin 15 at the end of each rod. Hence, each of the rods 12 may move outwardly against the compression of a spring 13.

A hinge block 16 is secured to each pair of rods 12, said block carrying a hinge sleeve 17. An abutment bracket 18 carries two spaced hinge sleeves 19 at its lower end which with hinge sleeve 17 and hinge pin 20 form a hinge about which the abutment bracket may be swung. The abutment bracket 18 at its lower sides carries oppositely extending anchor portions 20' which are slotted, as at 21, to receive the ends of toggle studs 11' which are pivotally mounted in slots 12' in the hinge bracket 16 by a pin 13'. The toggle studs 11' extend through the oppositely extending anchor portions 20' of the abutment bracket 18, whereby, by means of wing nuts 22, the abutment bracket may be mounted, as shown in Figs. 5 and 6. When it is desired not to use the abutment bracket, the wing nuts may be loosened and the toggle studs 11' pivoted out of contact with the abutment bracket through slots 21. The abutment bracket in its operative position is spring-biased by springs 13 and may be moved laterally outwardly against said spring compression. At the upper portion of the abutment bracket 18, an abutment plate 23 is formed, the purpose of which will hereinafter be more fully described.

In order to accommodate the runways 1 and 2 and turning radius plates to automobiles of different track widths, the channels 3 are removably clamped to the supporting transverse I-beams. The arrangement comprises a clamp 24 which at one side embraces a flange 25 of an I-beam 4 and at the other side forms a looped return bend 26 for embracing a flange 27 of the companion I-beam 4 and a clamp block 28. A U-shaped staple 29 engages in apertures in the clamp 24 and apertures in the adjacent flanges 30 of the companion I-beams 4, there being a plurality of pairs of such apertures in said companion flanges spaced along the length of the I-beams whereby the clamps 24 may be secured to a desired point along the length of the I-beams. A threaded screw 31, operable by means of handle 32 engages in a threaded aperture provided in the loop 26 whereby the clamp 24 may be rendered immovable with respect to I-beams 4 by the engagement of the end of screw 31 with the block 28. The clamp 24 may be rigidly secured to the lower edges of the channels 3, the arrangement being such that the channels 3 and, hence, runways 1 and 2 may be disposed a desired distance apart and locked to the transverse I-beams by the clamping arrangement described.

A wheel clamp 33 is employed with our device and comprises a fixed bracket 34 which at one end terminates in angularly spaced arms 35, the bracket 34 being essentially Y-shaped. A screw 36 is carried by spaced guides 37 upon the bracket 34 being substantially parallel to the staff-portion of the Y. Collars 38 embrace screw 36 on each side of a guide 37 and are removably securable to said screw to prevent axial movement of the screw, but permit rotation thereof. At its lower portion, as viewed in Fig. 6, the bracket 34 is provided with a longitudinal slot, as indicated by the dotted upper terminus 39 of the slot, said slot being parallel to the screw 36 and being open at its lower end. A block 40 is slidably positioned in said slot, said block also being threadedly engageable with the screw 36 whereby rotation of screw 36 moves block 40 vertically within said slot, as viewed in Fig. 6. An arm 41 is formed integral with block 40 and, as will be hereinafter more fully described, the arm 41 together with the arms 35 constitute the three wheel arms for grasping a rim 42 of the wheel 8. At the end of each of the arms 35 and 41 jaw members 43 are carried, said jaw members being provided adjacent their ends with slots 44 whereby the edge of rim 42 may be grasped. The jaws 43 are removably positioned upon the respective arms and may be removably secured thereto by means of screws 45 whereby said jaws may be changed to accommodate rims of different configurations or to replace the jaws which have been rendered inoperative through wear. The fixed bracket 34 carries intermediate its length a stub shaft 46 upon which the testing head 47 may be removably mounted. The details of construction of the testing head 47 will be hereinafter more fully described.

The testing head 47 comprises a bracket portion or frame 48 which is substantially L-shaped and which at one end terminates in a collar 49 which, in turn, is adapted to embrace stub shaft 46 to suspend the bracket portion or frame 48 from said shaft. A thumb-screw 50 functions to removably secure the collar 49 in rigid position upon shaft 46. The opposite portion of the frame 48 comprises a supporting platform 51 having integral spaced ribs 52 to strengthen the platform 51. Intermediate the length of the bracket portion 48 the bracket is of substantially H-section, as shown best at 53 in Figs. 10 and 11. Adjacent the opposite side of the platform portion 51, the frame 48 is connected to a casting 54 which extends upwardly and flares outwardly, the upwardly extending portion 54 being substantially of channel section, as shown best at 55 in Fig. 10.

A substantially cylindrical casing 56 is secured to the bracket portion 48 by means of screws 57 and 58 which pass through the side portion 53 and platform portion 51, respectively, of the bracket. A reinforcing bottom plate 59 is positioned within the casing 56 and screws 58 extend thereinto. The casing 56 is open at its upper end, as viewed in Figs. 8 and 9, and carries at its upper end a bearing ring 60 of substantially L-section.

Resting upon ring 60 and rotatable thereon is a circular measuring plate 61 which has a milled or knurled peripheral surface 62 whereby to facilitate manual turning of the plate. The plate 61 is frictionally retained in resilient contact with ring 60 by means of circumferentially spaced blade springs 63 secured to the bottom face of plate 61 by means of screws 64 or the like. The central portion of the upper face of plate 61 is recessed to receive a suitable cement 65 in which a conventional spirit level 66 is embedded. A scale 67 overlies the spirit level, said scale being provided with a slot 68 through which the bubble of the spirit level may be observed. The scale 67 carries calibrations 69 and 70 which are employed to measure caster and kingpin inclination, and camber, respectively, as will be hereinafter more fully described.

A frame 71 is suspended from the measuring plate 61, being secured thereto by means of screws 72, the upper portion of the frame being spaced from the lower portion of the plate 61 by a spacer 73. When the plate 61 is positioned upon the mouth of the casing 56, as hereinbefore described, the frame extends downwardly within said casing. A casting 73' comprising a pair of spaced supports 74 is secured to the lower side of the upper portion of the frame 71, said supports being spaced from each other and each being disposed adjacent an opposite side of the frame.

Each of the supports 74 is provided with a central aperture 75 for the reception of a pivot pin 76. The outer end of each pivot pin 76 is threaded, as at 77 in Fig. 9, and is adapted for threaded engagement with internally threaded apertures provided in the adjacent sides of the frame. A lock nut 78 engages the threads 77 externally of the frame sides and functions to lock each pin 76 in a desired position. Pins 76 are freely movable in apertures 75, said apertures functioning as supporting guides for the inner ends of the pins.

The inner end of each pivot pin 76 is conically pointed, as at 79 in Fig. 9, the conical portions of each pin seating in ball bearing assemblies 80 carried at the opposite ends of bore 81 provided in the upper end of a pendulous member 82. The member 82 at its upper end is of sleeve-like construction in which bore 81 is provided and a depending portion 83 extends downwardly from adjacent one end of the sleeve portion. The lower end of the depending portion 83 is offset inwardly and carries a non-magnetic metal plate 84, the plane of which is in substantially vertical alignment with the transverse axis of the sleeve-like portion of the member 82. As will be hereinafter more fully described, the plate 84 is employed, in conjunction with a magnetic field to damp the swing of the member 82.

An intermediate portion of the member 82 is of relatively greater width than the remaining portion thereof, as shown best at 85 in Fig. 8, and upon a face of the depending portion 83 an armature 86 is carried. The armature 86 comprises a plurality of stacked ferromagnetic lamina which are of a length substantially equal to the width of the portion 85 of the member 82. The lamina comprising the armature are secured in stacked relationship by a pin or rivet 87 (Figs. 9 and 10).

Three coils of wire 88, 89 and 90 are wound upon cores 91, 92 and 93, respectively (Figs. 8 and 10). The cores 91, 92 and 93 comprise integral portions of a plurality of stacked lamina 94, the lamina 94 being of substantially E-shape and being constructed of relatively thin ferromagnetic sheets. The stacked lamina 94 are confined between casting 73' and a coil retainer plate 95. The plate 95 is formed as a rectangular frame, the upper longitudinal sides of which are recessed, as at 96 in Fig. 8, to receive the lower portion of the stacked lamina 94. The casting 73' carries downwardly extending side walls 97 and a transverse downwardly extending intermediate wall 98 (Figs. 8 and 9), the latter being provided with recesses 99 to receive the upper portions of the cores 91, 92 and 93. The right-hand support 74, as viewed in Figs. 9 is also recessed, as at 100 to receive the upper portion of the stacked lamina, that is that portion which connect the cores 91, 92 and 93.

The member 82, the casting 73' and the plate 95 are preferably constructed of a non-magnetic metal. Armature 86, however, is constructed of magnetic material and the construction is such that said armature is swingable adjacent the magnetic cores 91, 92 and 93 of coils 88, 89 and 90 respectively. As will be hereinafter more fully described, coil 89 is an exciter coil and carries an alternating or pulsating current. Coils 88 and 90 are in mutually inductive relationship to coil 89 and hence, currents are induced in coils 88 and 90. However, the flux path of the flux common to coils 89 and 88 and 89 and 90 includes the armature 86 and, hence, angular movement of the member 82 changes the relative position of the armature 86 and cores 91, 92 and 93 and therefore changes the reluctances of said common flux paths and as a result currents induced in the coils 88 and 90 by the current flowing in coil 89 will vary, depending upon the angular position of the member 82. As will be hereinafter more fully described, this relationship of the angular position of member 82 and the induced currents in coils 88 and 90 is employed in the present invention.

A pair of permanent magnets 101 is carried upon the lower portion of frame 71, said magnets being disposed in spaced relationship to each other and are of the horseshoe type with like poles adjacent each other. A block 102 is carried on the top of each magnet and is employed to frictionally hold the magnet 101 in place by means of screws 103 which pass through an aperture 104, the threaded ends of the screws being engageable with the blocks 102. The magnets 101 and blocks 102 are so positioned that a slot 105 is provided into which the plate 84 carried by member 82 may freely move when member 82 swings. Movement of the plate 84 in slot 105, that is, through the magnetic field established by magnets 101, induces eddy currents in the plate 84 whereby a damping effect is produced upon the movement of member 82. Hence, when member 82 is swung to a predetermined position it will not oscillate excessively about said position.

Referring particularly to Fig. 2, 106 indicates a source of electric current, preferably alternating current of low voltage. The exciter coil 89 is connected across said source of current and sets up an alternating flux in core 94 which links with pick-up coils 88 and 90. The coils 88 and 90 are connected together by conductor 107 and the opposite end of coil 88 is connected to the opposite end of coil 90 through resistances 108, 109 and 110. Rectifier elements 111 are included in the circuit to rectify the alternating current induced in the coils 88 and 90. A galvanometer 112, Fig. 2a, shunted by resistance 113 is adapted to be connected between conductor 107 and an intermediate point of resistance 109 by conductors 107' and 109', a variable resistance 114 being in series with the galvanometer. A bridge is thus formed including pick-up coil 88 and resistance 108 and pick-up coil 90 and resistance 110 together with portions of the resistance 109. The manner of selectively connecting the galvanometer in circuit will be hereinafter more fully described.

The arrangement is such that when the longitudinal axis of the armature 86 is positioned parallel to the plane of the core 94, the bridge will be balanced and the galvanometer will read zero. When, however, the member 82 swings to a different position the induced voltages in coils 88 and 90 will be changed in proportion to the change in reluctance of the common magnetic paths of coils 88 and 89, and 90 and 89 and, hence, the current flow through the galvanometer 112 will be proportional to such change. It will be noted, particularly from Fig. 9, that the normal position of the armature is below the central horizontal plane of the core 94; that the upper surface of the armature is normally in substantial coplanar relationship with the central horizontal plane of the core 94; and that the axis of rotation of the armature is above the core 94. The arrangement is such that the total projected area of the armature 86 upon the ends of cores 91, 92 and 93 is constant for any angular inclination of the element 82 which may be met with in practice. In other words, as the projected area of armature 86 increases with respect to, for instance, core 93, it decreases to the same extent with respect to core 91 and vice versa. In this fashion a linear relationship is established between the difference in the induced E.M.F. in coils 88 and 90 and the angle assumed by the member 82.

Referring particularly to Figs. 3 and 4, the galvanometer 112 may carry upon its moving element, a mirror 115 and spaced from the mirror a light source 116 is positioned so as to cast a beam of light upon the mirror. The galvanometer and light source may be positioned in a cabinet 117 carrying in its front wall a pair of translucent windows 118. The translucent windows may be calibrated to provide three scales 119, 120 and 121, all of the scales having a zero center point. The beam from light source 116 reflected from mirror 115 is cast upon the rear face of the translucent window 118 to form a light spot 122 which, of course, will move over the scales when the galvanometer is energized by a change in angular position of member 82. Two units comprising galvanometer, light source and window are carried by the housing 117, one for each wheel to be measured, said galvanometers being connected to the respective testing head 47 by means of cables 123.

In the initial calibration of the device, the variable resistance 114 in series with the galvanometer is adjusted to conform the range of the meter to the range of the spirit level 66 and the scale 67. This adjustment when once made remains constant throughout the tests. The variable resistance 109 is used to change the zero position of the galvanometer and may be adjusted during some of the tests particularly in measuring caster and to conveniently change this resistance, said resistance may be housed in casing 124 mounted upon wall 54 of the testing head 47, the resistance being conveniently changed by manipulation of knob 125.

In the measurement of camber, with the head 47 so positioned as to have core 94 horizontal, the element 82 will be disposed vertical and the light spot 122 should be disposed centrally upon scale 120. If the spot is not central, knob 125 may be manipulated to bring about this condition by changing variable resistance 109.

With the testing head 47 positioned upon the shaft 46, the wheel clamp 33 may be secured to the rim of the wheel 8 as has been hereinbefore described. If the wheel 8 has camber the testing head 47 will be canted and as a consequence the member 82 will swing from its normal position to a position wherein the armature 86 is at an angle to the plane of the core 94. As a consequence the bridge comprising the pick up coils 88 and 90 will be unabalanced and an indication of said unbalance will be given upon window 118 by the movement of the light spot 122. The camber can then be directly read from the scale 120.

To measure caster the wheel 8 may be swung through an angle of approximately 20° and with the wheel clamp 33 secured to the wheel the testing head 47 will be canted a predetermined degree. The light spot 122, due to the canting of the test head will be displaced from the zero position upon scale 119. The knob 125 may then be so manipulated as to change the variable resistance 109 until the light spot 122 is brought to zero position upon the scale 119. The wheel 8 may then be swung through an angle of approximately 20° in the opposite direction from its straight-ahead position. The testing head still secured to the wheel clamp 33 will be canted and as a consequence the light spot 122 will move from the preset zero position. The center of the light spot may then be read upon the scale 119 and the caster in degrees will be indicated by the position of the light spot.

Of course, camber and caster may be read upon the scales 68 and 67, respectively, by noting the position of the bubble within tube 66. However, the cabinet 117 may be disposed at any convenient location whereby the measurements may be observed remotely from the testing head itself.

Referring particularly to Figs. 6, 8 and 11, the wall 54 is provided at its lower portion with an aperture 197 through which a control arm 198 extends. An abutment plate 199 is carried at the end of the arm 198 exteriorly of the wall 54, said plate being adapted to be disposed in plane-parallel contacting relationship with plate 23 carried by the member 18. Adjacent its inner end, control arm 198 is pivotally mounted upon shaft 200 which is mounted upon the plate 59. A radius arm 201 is also pivotally mounted upon shaft 200 and is secured to arm 198 by means of pin 202 whereby both arms 198 and 201 move angularly about pivot shaft 200 as a unit. A segmental gear 203 is carried at the opposite end of the radius arm 201, the teeth of which mesh with the teeth of pinion 204 mounted upon shaft 205.

A bracket 206 is mounted upon plate 59, being secured thereto by screws 207, said bracket being recessed to receive a sleeve 208 in which shaft 205 is rotatably carried. The sleeve 208 is secured to a casing 209 in which a variable electrical resistance is carried.

Referring particularly to Fig. 2b, 210 indicates a source of low voltage current which may comprise the same source as source 106, as will be hereinafter more fully described. A resistance bridge circuit is provided comprising an arm including a portion of resistance 211; an arm comprising the remaining portion of resistance 211; an arm comprising fixed resistance 212 and a portion of the variable resistance 213; and an arm including fixed resistance 214 and the remaining portion of the variable resistance 213.

In order to use the same galvanometer 112 accompanied by shunt resistance 113, and the same source of current for the circuits shown in Figs. 2 and 2b, a rotary selector switch 215, Fig. 2c, is employed. The selector switch 215 comprises three simultaneously operated six-point units which function as follows. A source of low voltage alternating current is connected to terminals A and B of unit 216. When the switch is manipulated, terminals A and B may be selectively connected to switch terminals E and F in two switch positions, or to U and K in one switch position. When connected to E and F, current from A and B is conducted to terminals E' and F' in Fig. 2; and if connected to terminals U and K, current from A and B is conducted to terminals U' and K' in Fig. 2b.

Switch unit 217 has terminals C and D connected to terminals C' and D' of the galvanometer assembly illustrated in Fig. 2a. When the switch is manipulated to energize the circuit shown in Fig. 2, the terminals C and D will connect with switch points G and H which, in turn, will connect with G' and H' in the circuit of Fig. 2. When the circuit of Fig. 2b is energized, terminals C and D will connect with points L and M which in turn connect with terminals L' and M' of Fig. 2b.

Thus, in two positions of switch 215, the circuit of Fig. 2 will be energized and the galvanometer assembly will be connected in said circuit, and in the remaining position of switch 215, the circuit of Fig. 2b will be energized and the galvanometer assembly will be connected therein.

A conductor 218 connects terminal U' through a variable resistance 219 to resistance 211, the variable resistance 219 being a controlling resistance which would be manipulated infrequently and controls the total current fed to the resistance bridge circuit. Resistance 211 is contained within casing 209 and the variable point upon said resistance is controlled by the shaft 205, which carries pinion 204. The resistance 213 is contained within casing 228 mounted upon the side wall of casing 56, the variable point of said resistance being controlled by the manually manipulatable knob 229. The opposite terminal K' is connected by means of conductor 220 through a rectifier unit 221 to an intermediate point of resistance 213.

The resistance bridge circuit hereinbefore described is employed in obtaining a remote reading of toe-in of the wheel 8. To measure toe-in, with the wheels of the vehicle in straight-ahead position, the wheel clamp 33 may be fastened to the rim of wheel 8 in the manner hereinbefore described. However, the wheel clamp is disposed substantially horizontally upon the wheel rather than in the vertical position used to measure caster and camber. The testing head 47, by the proper manipulation of set screw 50, is disposed vertically in suspended position from shaft 46. If the wheel is "toed-in" or "toed-out," that is, if the central plane of the wheel is at an angle to a vertical plane passed through the longitudinal axis of the vehicle, the head 47 will assume a position forwardly or rearwardly of the axle of the vehicle. However, the abutment plate 23 has its plane vertical and parallel to the longitudinal axis of the vehicle. Abutment plate 199 carried on arm 198 remains in plane parallel relationship with plate 23 and, hence, arm 198 is swung about shaft 200 which, in turn, swings arm 201 rotating pinion 204 and shaft 205. In this fashion the portion of the resistance carried by the bridge arms in which said resistance is connected, is changed to an extent proportional to the angle of swing of arm 201 and, hence, in proportion to the angular position of the central plane of the wheel with respect to the vertical axial plane of the vehicle.

In calibrating the resistance bridge illustrated in Fig. 2b and galvanometer 112 when it is connected in said bridge, the zero position of the light spot 122 upon scale 121 will occur when pinion 204 meshes at the central portion of the segmental gear 203. Hence, any displacement from this position unbalances the bridge in proportion to the angle of displacement and, accordingly, the toe-in or toe-out may be read upon scale 121.

The switch 215 may be manipulated by the knob 215' (Fig. 5).

In order to provide selective lighting for pilot lights 222, 223 and 224 which indicate that scales 119, 120 or 121 are to be read, a third unit 225 of switch 215 is employed. A source of electric current 226 is employed which may be of different voltage from that across A and B. One side of the pilot lights 222, 223 and 224 is connected to one side of source 226, Fig. 2d, and the opposite sides of the respective lights are connected through terminals R', S' and T' respectively to switch points R, S and T. A common point P of unit 225 is connected through terminal P' to the opposite side of source 226.

The arrangement is such that when caster is to be measured, the switch 215 is so manipulated as to energize the circuit of Fig. 2; the galvanometer assembly of 112 is connected into the circuit of Fig. 2 and pilot light 222 is lighted and, hence, the operator observes readings on scales 119. When camber is to be measured, the switch 215 is manipulated to its second position wherein the circuit of Fig. 2 is still energized and the galvanometer is in circuit therewith, but pilot light 223 will be illuminated. Hence, readings will be taken on scales 120. When king pin inclination is to be measured, the switch 215 is moved to its third position wherein the circuit of Fig. 2b is energized and the galvanometer assembly is connected therein, and pilot light 224 is illuminated. The operator will then observe the readings on scales 121. An electric light 116' contained with the beam assembly 116 may be connected directly across the source 226 and will be unaffected by the position of switch 215.

The toggle switch 230 mounted upon the front panel of cabinet 117 is a control switch and functions to connect or disconnect the cabinet to a source of electric power.

We claim as our invention:

1. An alignment tester for the wheels of an automotive vehicle which comprises a fixed support for said wheels, a frame, electrical resistance means carried by said frame, an electrical bridge circuit in which said electrical resistance means is connected, control means pivotally mounted upon said frame to rotate about a predetermined axis, means resiliently mounted upon said support making separable resilient following contact with said control means to hold said control means substantially immovable relative to said support, said control means controlling said electrical resistance means in response to the angular position thereof relative to said frame, means for moving said frame relative to said control means, said means comprising a wheel clamp adapted to be connected to a wheel the alignment of which is to be tested in predetermined angular relation to the plane of the wheel, means securing said wheel clamp to said frame so that said predetermined axis is substantially parallel to said plane to move said frame in response to a predetermined angular position of said wheel, and electrical indicating means remote from said frame and connected to said electrical bridge circuit for measuring the current unbalance in said bridge circuit when the angular position of the frame and control means has been changed.

2. An alignment tester for the wheels of an automotive vehicle which comprises a fixed support for said wheels, a frame, electrical resistance means carried by said frame, an electrical bridge circuit in which said electrical resistance means is connected, control means pivotally mounted upon said frame to rotate about a predetermined axis, an abutment plate carried by said control means, an abutment plate resiliently mounted upon said support making separable, resilient, following, plane-parallel contact with the control means abutment plate to hold said control means substantially immovable with respect to said support, said control means controlling said electrical resistance means in response to the angular position thereof relative to said frame, means for moving said frame relative to said control means, said means comprising a wheel clamp adapted to be connected to a wheel the alignment of which is to be tested in predetermined angular relation to the plane of the wheel, means for securing said wheel clamp to said frame so that said predetermined axis is substantially parallel to said plane to move said frame in response to a predetermined angular position of said wheel, and electrical indicating means remote from said frame and connected to said electrical bridge circuit for measuring the current unbalance in said bridge circuit when the angular position of the frame and control means has been changed.

3. An alignment tester for the wheels of an automotive vehicle which comprises a fixed support for said wheels, a frame, electrical resistance means carried by said frame, an electrical bridge circuit in which said electrical resistance means is connected, pinion means upon said frame for changing the resistance of said resistance means, a control arm pivotally mounted upon said frame to rotate about a predetermined axis, an abutment plate carried upon said control arm, a segmental gear engageable with said pinion means to change said resistance when said arm and frame change relative positions, an abutment plate resiliently mounted on said support which makes separable resilient following contact with said control arm abutment plate to hold said control arm relatively immovable with respect to said support, means for moving said frame relative to said arm, said means comprising a wheel clamp adapted to be connected to a wheel the alignment of which is to be tested in predetermined angular relation to the plane of the wheel, means suspending said frame from said wheel clamp to move said frame relative to said support in response to a predetermined angular position of said wheel so that said predetermined axis is substantially parallel to said plane, and an electric meter remote from said frame and connected to said electrical bridge circuit for measuring the current unbalance in said bridge when the angular position of the frame and the arm has been changed.

References Cited in the file of this patent

UNITED STATES PATENTS

| | | |
|---|---|---|
| 2,285,965 | Halstead | June 9, 1942 |
| 2,378,631 | Holmes | June 19, 1945 |
| 2,475,502 | Holmes | July 5, 1949 |
| 2,477,574 | Braddon | Aug. 2, 1949 |
| 2,603,881 | Holaday | July 22, 1952 |
| 2,578,385 | Martin | Aug. 14, 1956 |